INVENTOR
EMILE RIMAILHO.
BY
ATTORNEYS

Mar. 6, 1923.

E. RIMAILHO

COMBINED WHEELED AND ENDLESS TRACK VEHICLE

Filed Nov. 22, 1919     6 sheets-sheet 4

1,447,890

INVENTOR
EMILE RIMAILHO.
BY
ATTORNEYS.

Mar. 6, 1923. 1,447,890

E. RIMAILHO

COMBINED WHEELED AND ENDLESS TRACK VEHICLE

Filed Nov. 22, 1919 6 sheets-sheet 5

INVENTOR
EMILE RIMAILHO.
BY
ATTORNEYS.

Mar. 6, 1923. 1,447,890
E. RIMAILHO
COMBINED WHEELED AND ENDLESS TRACK VEHICLE
Filed Nov. 22, 1919 6 sheets-sheet 6
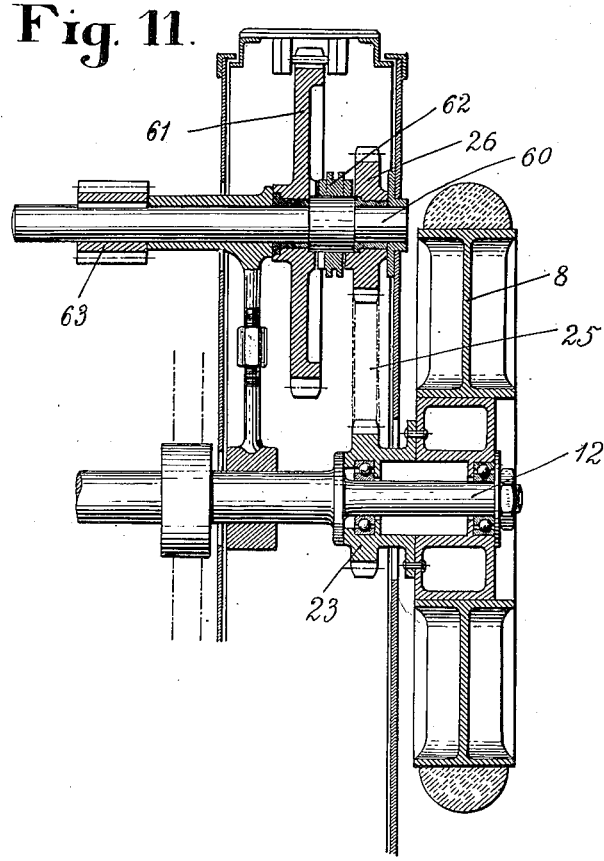
INVENTOR
EMILE RIMAILHO
BY
ATTORNEYS Patented Mar. 6, 1923.

1,447,890

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

COMBINED WHEELED AND ENDLESS-TRACK VEHICLE.

Application filed November 22, 1919. Serial No. 339,903.

*To all whom it may concern:*

Be it known that I, EMILE RIMAILHO, a citizen of the French Republic, and residing in Paris, France, 12 Rue de la Rochefoucauld, have invented certain new and useful Improvements in and Relating to Combined Wheeled and Endless-Track Vehicles, of which the following is a complete specification.

The invention refers to apparatus for throwing the wheels into and out of action in a vehicle having both wheels and endless tracks as means of progression.

It has been recognized as necessary to construct for example, for the transport of artillery and the requirements of agriculture an automobile vehicle capable of drawing or carrying a load on roads, across fields or over all kinds of uneven ground, and for this purpose vehicles have been constructed with two means of progression, one being ordinary wheels and the other endless tracks.

This invention provides a construction of apparatus in an automobile or other vehicle, having wheels and endless tracks and capable of drawing directly or by towage or of carrying a load over any kind of ground, whereby either of these two methods of progression may be brought into use at will in a rapid and convenient manner, one being suitable for roads and permitting of the attainment of rapid speeds for prolonged periods and the other being suitable for various kinds of ground to be traversed whether in roads or in any other place.

It is obvious that the vehicle provided with the invention may be a motor vehicle or not, may have four wheels or not, and may form a trailer and transport loads of all kinds.

In the accompanying drawings, which represent by way of example, various modes of carrying out the invention:

Figure 11 is a sectional view showing a clutch.

Figure 1:
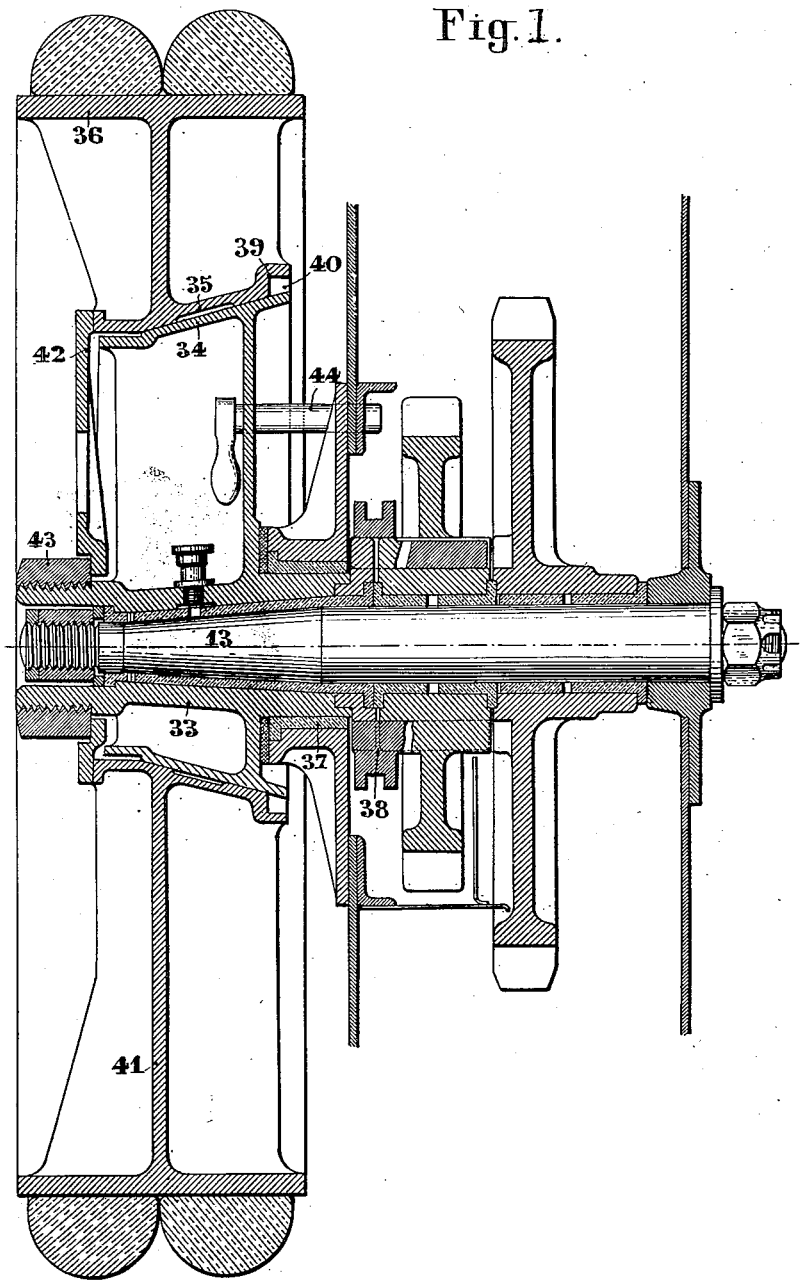
Figure 1 is a vertical section of an apparatus for throwing the wheels out of action by a wheel with an eccentric hub.

In the apparatus, the wheel is provided with an eccentric hub (see Figure 1) and the shaft 13 of the sprocket of the endless track is prolonged sufficiently to receive a socket or hub 33 forming part of an eccentric 34, preferably of truncated cone shape which engages in an eccentric hub 35 of corresponding shape, connected, in the usual manner to the tire 36 of the wheel. The socket 33 is loose on the axle 13 and can turn freely in the bearings of the sides 37, and is actuated at will by a suitable clutch for example 38, placed in the interior of the sides of the endless track. The eccentric hub 35 is provided with driving tappets 30. The wheel 41 is kept in engagement with the eccentric 34 by the aid of an eccentric plate 42 held in position either by a nut 43 screwed onto the socket 33, or by bolts, not shown, distributed round its periphery.

When the parts are in the position shown in Figure 1 the eccentric wheel 41 is in position on the eccentric 34 to travel on the ground, that is to say, the axis of its outer tire coincides with the axis of the socket 33 and of the axle 13. In this position the eccentric hub 35 is completely engaged on the conical eccentric 34, its driving tappets 39 are in engagement with the corresponding stops 40 on the eccentric 34 of the socket 33, and the parts are maintained in engagement and in assembled driving relation to permit driving of the wheel by means of the plate 42 and nut 43.

In this position, as the axis of the tire 36 coincides with the axis of the shaft 13, it follows that the movement takes place as if the eccentricity did not exist, that is to say as with an ordinary wheel.

The function of the eccentric hub is apparent when starting to run on the endless tracks. After having caused the rear of the endless track to rise on wedges, it is necessary to place the wheels in the high position in order that they may be raised off the ground when the vehicle rests on its endless tracks.

The eccentric 34 having been disconnected from the gearing by the clutch 38, is brought to its highest position and is locked therein by engaging a locking bolt 44 in a hole in the side piece and then the nut 43 of the eccentric plate 42 is slightly unscrewed to cause sliding under the action of gravity of the eccentric wheel on the conical ring of the eccentric hub 35. As soon as the driving tappets 30 are no longer in engagement with the stops 40, the wheel is caused to make half a revolution. It is then fixed immovably by means of the plate 42 and the operation is finished.

The half turn given to the wheel has the effect by its eccentric hub turning on the eccentric 34 to raise the wheel. The radius of eccentricity of the two tires of the wheel is chosen so as to obtain such an amount of lift that the wheels at the side of the vehicle offer no obstruction to the working of the endless track.

Figure 2:
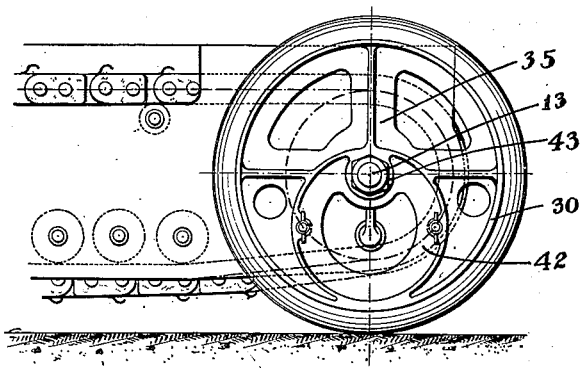
Figure 2 represents an elevation of an apparatus of a similar kind adapted to the shaft of the driving sprocket of an endless track vehicle.
Figure 3:
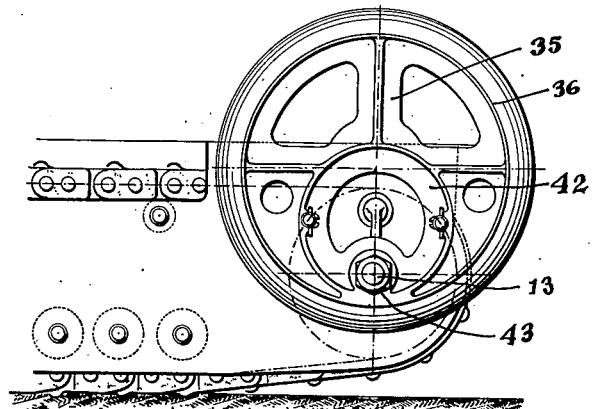
Figure 3 shows the apparatus shown in Figure 2 the eccentric wheel occupying the raised position and the track shoes being in contact with the ground.

In Figures 2 and 3 which represent the application of the invention to an endless track vehicle, the wheel with the eccentric hub is mounted on the sprocket axis 13 which drives the endless track. The lock nuts of the wheel set out of centre on the eccentric are of the ordinary type as will be seen from the figures.

Figure 4:
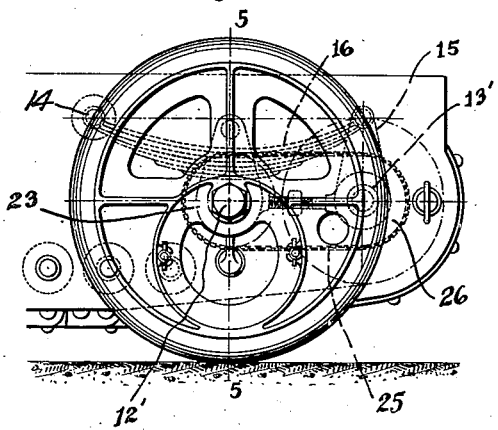
Figure 4 shows the application of the wheel with the eccentric hub with an endless track vehicle provided with an elastically suspended axle, the vehicle being represented in the position of motion along a road.
Figure 5:
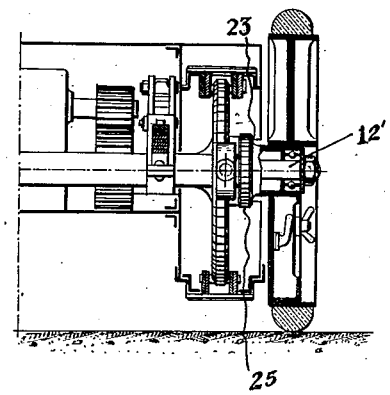
Figure 5 is a section on the line 5—5 of Figure 4.
Figure 6:
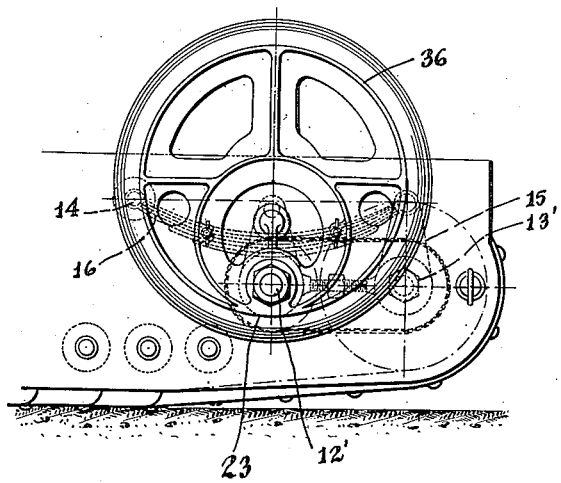
Figure 6 represents the endless track vehicle shown in Figure 4 in the position of movement on the track, the wheel with the eccentric hub being in the raised position.

Figures 4, 5 and 6 show the application of the invention to vehicles with elastic suspension in which the motive power is transmitted to each wheel through a chain passing as upon the sprocket wheel. The axle 12' of the wheel is placed in close proximity to the sprockets 13' of the endless track, its distance from the shaft of these latter being for instance regulated by means of stretchers.

The axle 12' of the wheel is provided with an elastic suspension constituted by a spring 16 mounted on the one hand upon a shackle 15 solid with the sprocket axle, and on the other hand upon a fixed point 14 of the frame.

Each end of the wheel axle carries a chain or sprocket wheel 23 which turns freely on the wheel axle and is connected by a chain 25 to a similar pinion 26 likewise mounted loose on the sprocket shaft 13'.

The representation made of the wheel with the eccentric hub applied to a single driving axle is obviously applicable to all the driving axles of the same vehicle.

Figure 8:
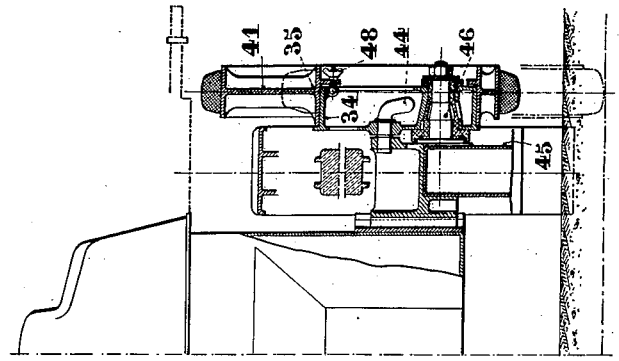
Figure 8 is a half section of Figure 7.
Figure 7:
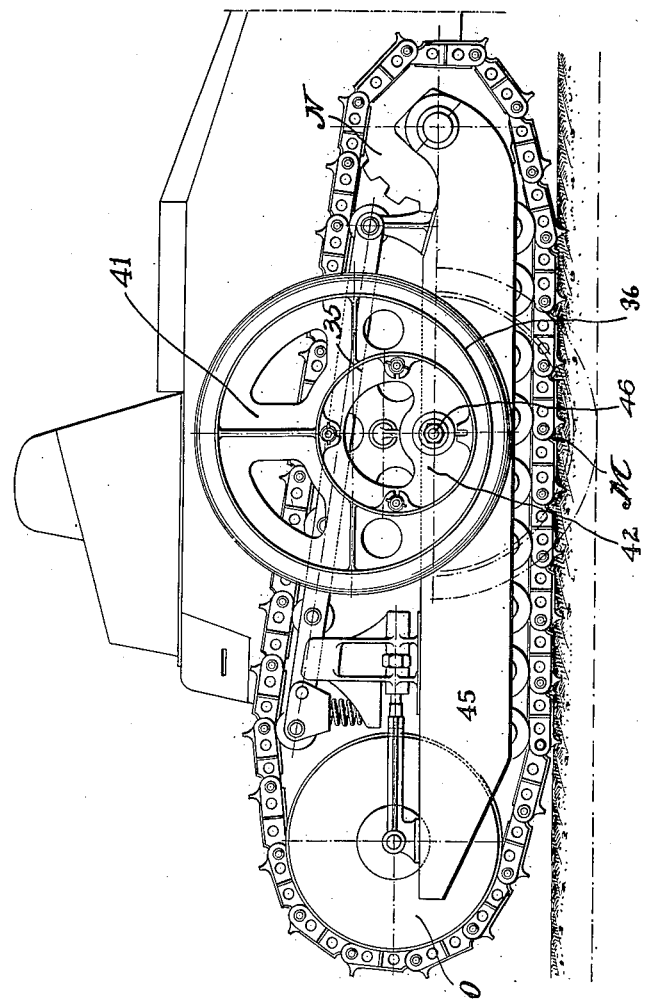
Figure 7 shows the application of the apparatus with the eccentric wheel to a light armoured car.

Figures 7 and 8 show the application of the apparatus with the eccentric hub to a light armoured car of a well known type, comprising a frame 45 at each side provided with an endless track M actuated by the sprocket wheel N and loosely rolling on a loose wheel or pulley O.

Mounted on the frames 45 which carry the endless tracks, are two stub axles 46, and on each of them is mounted a wheel 41 with an eccentric hub 35 (represented as of cylindrical form instead of truncated cone shape). The wheel is held in place by means of bolts 48.

Figure 9:
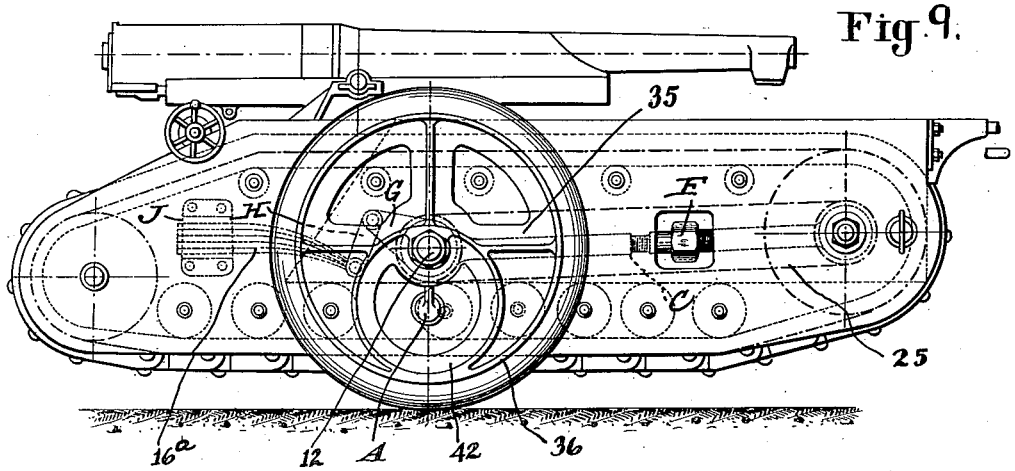
Figure 9 represents the apparatus for throwing the wheels out of action by means of the wheel with the eccentric hub applied to a vehicle forming a complete artillery outfit.
Figure 10:
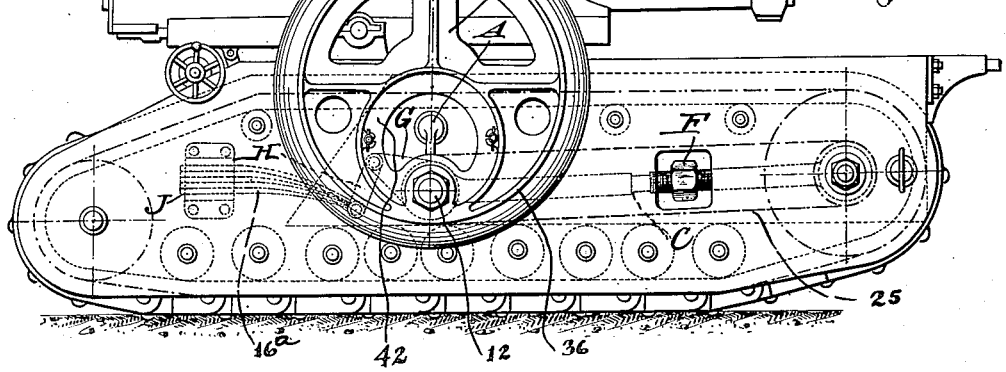
Figure 10 shows the arrangement of Figure 9, the wheel with eccentric hub being in the raised position.

Figures 9 and 10 represent the application of the device to a vehicle forming a complete artillery outfit, the vehicle being likewise supported on wheels, by the aid of the two wheels with the eccentric hub and elastic suspension 16ª. The elastic suspension may consist of a spring of any description. The axle A of the wheel is mounted at the end of a bar or stretcher bolt C pivoted on the axle of the fore wheel of the tractor. The said bolt C is provided with a nut F to regulate its length. The end of the bolt C is provided with a lever G connected through a link H to a blade spring secured upon the frame at the end J.

In Figure 11, there is shown the clutch employed in Figures 4, 5 and 6. The chain wheel or sprocket 23 is solid with the hub of the wheel 8 which is rotatably mounted upon the axle 12. The chain 25 operating the wheel 23 passes over the sprocket wheel 26, loosely mounted upon an axle upon which is also loosely mounted a wheel 61 to control the tractor. Between both the wheels 25 and 61 is provided a clutch 62 slidably mounted upon the axle and connected with the latter by means of a key, not shown in the drawings. This clutch 62 is provided upon its sides with teeth or jaws which may be brought by any suitable controlling means not shown in the drawing into engagement with either of the wheels 26 and 61. The shaft 60 is connected with the motor by means of a gear 63 meshing with a convenient row of other gears not shown.

What I claim is:

1. In a motor vehicle provided with both endless tracks and wheels, axles, eccentrics on the axles, wheels mounted on the eccentrics, means including the eccentrics for bringing the wheels out of contact with the ground, and means for driving the eccentrics and the wheels thereon.

2. In a motor vehicle having endless tracks and wheels, a frame, an axle carried thereby, an eccentric loose on the axle, a wheel having an eccentric hub movably mounted and fitting on the eccentric of the axle, means for locking the eccentric and hub together, and means for locking the eccentric stationary to the frame or permitting the same to run free thereof.

3. In a motor vehicle having endless tracks and wheels, an axle, an eccentric loose on the axle, a wheel having an eccentric hub movably mounted on the eccentric and having an interlocking engagement therewith, means for holding the wheel on the eccentric, and means for locking the eccentric stationary.

4. In a motor vehicle having endless tracks and wheels, an axle, an eccentric loose on the axle, a wheel having an eccentric hub movably mounted on the eccentric, the hub and eccentric having interlocking projections on their engaging surfaces, means for holding the wheel on the eccentric, and means for locking the eccentric stationary.

5. In a motor vehicle having endless tracks and wheels, an axle, a conical eccentric loose on the axle, a wheel having a conical eccentric hub slidably mounted on the eccentric and having interlocking engagement therewith, means for holding the wheel on the eccentric, and means for locking the eccentric stationary.

6. In a motor vehicle having endless tracks and wheels, an axle, a cone-shaped eccentric loose on the axle and provided with projections, a wheel having a correspondingly shaped eccentric hub mounted on the eccentric of the axle and having projections interlocking with the projections of the eccentric, a plate secured on the axle and engaging the hub of the wheel, and means for locking the eccentric stationary.

7. In a motor vehicle having endless tracks and wheels, a sprocket axle, an eccentric adjustably mounted on the axle, a wheel having an eccentric hub mounted on the eccentric, and means for locking eccentric and hub together.

8. In a motor vehicle having endless tracks and wheels, an axle, an eccentric loose on the axle, a wheel having an eccentric hub movably mounted on the eccentric, disengageable locking means between the eccentric and hub, means for holding the wheel on the eccentric, and means for locking the eccentric stationary.

In testimony whereof I have hereunto set my hand at Paris, France, this 24 day of October, 1919.

EMILE RIMAILHO.

In the presence of—
CHAS. P. PRESSLEY